United States Patent [19]

Steffenhagen

[11] Patent Number: 4,943,797
[45] Date of Patent: Jul. 24, 1990

[54] DEVICE FOR TEMPORARILY BLOCKING THE RE-MEASUREMENT OF AN ELECTRIC OIL LEVEL MEASUREMENT OF A MACHINE, PARTICULARLY AN INTERNAL COMBUSTION ENGINE

[75] Inventor: Ulrich Steffenhagen, Liederbach, Fed. Rep. of Germany

[73] Assignee: VDO Adolf Schindling AG, Frankfurt am Main, Fed. Rep. of Germany

[21] Appl. No.: 403,000

[22] Filed: Sep. 5, 1989

Related U.S. Application Data

[60] Continuation of Ser. No. 139,611, Dec. 30, 1987, abandoned, which is a division of Ser. No. 762,939, Aug. 6, 1985, Pat. No. 4,739,301.

[30] Foreign Application Priority Data

Aug. 6, 1984 [DE] Fed. Rep. of Germany ....... 3428908

[51] Int. Cl.$^5$ .............................................. B60Q 1/00
[52] U.S. Cl. .................. 340/450.3; 340/622; 73/290 R; 73/295
[58] Field of Search ............... 340/59, 52 F, 620, 622, 340/527, 450.3; 73/290 R, 295

[56] References Cited

U.S. PATENT DOCUMENTS 4,503,419 3/1985 Kidd et al. ..................... 340/52 F
4,739,301 4/1988 Steffenhagen ................. 340/622 X

FOREIGN PATENT DOCUMENTS 2308370 9/1974 Fed. Rep. of Germany .
2904145 8/1980 Fed. Rep. of Germany .

Primary Examiner—Joseph A. Orsino
Assistant Examiner—Jeffery A. Hofsass
Attorney, Agent, or Firm—Martin A. Farber

[57] ABSTRACT

A device for electrically measuring the oil level of a machine, particularly of an internal combustion engine, is connected with a device for temporarily blocking re-measurement. The device for the measurement of the oil level comprises a measurement probe (2) which is heated by a constant current during a connect time which is commenced in an automotive vehicle by a switch on a battery terminal (15). Furthermore, means are provided for comparing an initial voltage $U_O$ of the measurement probe at the start of the connect time with a measured voltage at the end of the connect time of a measurement period in order to form a result of the comparison which corresponds to the oil level. A signalling logic (7) which signals ranges of the oil level can be controlled by said result. The blocking-time transmitter, in combination with a control logic (10) for the total program control, blocks repeated measurement during at least one predetermined period of time after the machine is turned off or again turned on. In order to take into account a temperature-dependent difference in return-flow time of the oil in ducts of the machine before a new measurement, the blocking-timer transmitter (21-24) can be controlled to produce a variable blocking time as a function of the initial voltage $U_O$ of the initial measurement, in such a manner that the blocking time decreases with an increase in the initial voltage $U_O$.

6 Claims, 2 Drawing Sheets

DEVICE FOR TEMPORARILY BLOCKING THE RE-MEASUREMENT OF AN ELECTRIC OIL LEVEL MEASUREMENT OF A MACHINE, PARTICULARLY AN INTERNAL COMBUSTION ENGINE

RELATED APPLICATION

This application is a continuation of my co-pending application Ser. No. 07/139,611 filed Dec. 30, 1987 now abandoned which in turn is a divisional application of Ser. No. 06/762,939 filed Aug. 6, 1985 (now U.S. Pat. No. 4,739,301 issued Apr. 19, 1988).

FIELD AND BACKGROUND OF THE INVENTION

The present invention relates to a device for temporarily blocking the re-measurement of an electric oil-level measurement of a machine.

Particularly the invention relates to a device for temporarily blocking the re-measurement of an electric oil measurement of a machine, particularly an internal combustion engine, it having a measurement probe which is heated by a constant current during a connect time which is commenced by a switch for the placing in operation of the machine, in particular an ignition switch, means for comparing an initial voltage $U_O$ on the measurement probe at the start of the connect time with a measurement voltage at the end of the connect time of a measurement period, a signalling logic which can be controlled as a function of the result of the comparison in order to signal the oil level, and a blocking-time transmitter which, in combination with a control logic, blocks repeated measurement for at least a predetermined period of time after the machine is turned off or again turned on.

With one such known device the oil level of an internal combustion engine is measured in the manner that upon actuation of the ignition key and before the starting of the internal combustion engine the measurement probe is acted on by a constant current and the voltage drop on it is measured and evaluated during different points of time of the connect time. The measurement probe has a relatively high temperature coefficient, in particular a positive temperature coefficient in the case of a measurement probe consisting of nickel/iron wire, so that the voltage drop on the measurement probe increases with an increase in the temperature. At the start of the connect time of the constant current, a first measurement is effected, namely with an initial voltage $U_O$ which is dependent on the ambient temperature and/or the oil temperature. Upon the heating of the measurement probe by the constant current the temperature of the measurement probe changes as a function of the level of the oil, which takes up a larger or smaller amount of the heat. Thus the measurement voltage which is measured at the end of the connect time and compared with the initial voltage $U_O$ is a measure of the oil level. As a function of the result of the comparison, the "warning" or "non-warning" condition of a warning lamp can be brought about via a signalling logic.

It is known that, upon the starting of an internal combustion engine and its further operation, the oil is conducted out of the crankcase sump via ducts to holes on the surfaces to be lubricated. As a result, the oil level in the crankcase sump drops even if a sufficient amount was originally present. Upon the turning off of the engine, the oil gradually flows back into the sump, so that after a very long time an oil level is reached which is a reasonably exact measure of the amount of oil actually present.

Accordingly, the oil level which can be measured upon the starting of the internal combustion engine is not directly a measure of the amount of oil present in the engine, which in particular makes it difficult to effect a properly dosed refilling of the oil. In this connection, it must be borne in mind that, when the internal combustion engine is turned off, as a rule one does not have all the time necessary in order to wait so as to be certain that all of the oil has returned and thus obtain a measurement result which is definitely valid. In addition to this, there is the fact that the oil level of the internal combustion engines in automotive vehicles is frequently measured by the driver and thus not always by technically interested and/or trained persons. If special measures are not taken, it must therefore be feared that too much oil will be added since the signalling device erroneously signals too small an amount of oil in the engine, as a result of the oil which is present in the ducts and has not flown back, or else the driver no longer needs a warning for the reasons described and fails to refill even if it should be necessary. The disadvantageous consequences of too small an amount of oil for lubrication and cooling in internal combustion engines are well known, as are also the disadvantageous consequences of too large an amount of oil, the excess of which, in the best of cases, is thrown out unused by the engine.

Therefore, in one known device for the electric measurement of oil, a device for blocking re-measurement has already been provided which is intended to take into account the return flow of the oil into the crankcase sump. The device for blocking re-measurement has the result that for a fixed predetermined blocking time after an immediate restart of the engine no new measurement can, for the time being, take place in order to permit the oil to return in the meantime.

However, it has been found that this device for blocking re-measurement can operate satisfactorily only for given parameters of ambient temperature and oil temperature since the viscosity, and thus the return time of the oil, is, as is known, dependent on temperature. This has the result that in hot weather and with a hot engine the oil flows rapidly back into the crankcase while the same process takes a relatively very long period of time in very cold weather and when the engine has been operated only for a short time.

SUMMARY OF THE INVENTION

It is an object of the present invention to improve a device for temporarily blocking the re-measurement of an electric oil level measurement of a machine in the manner that the temperature-dependent viscosity of the oil is taken into account, without thereby substantially increasing the cost of manufacture of the device, which is intended for use also in mass-produced vehicles.

According to the invention, the blocking time transmitter (21-24) for the production of a variable blocking time can be controlled in such a manner as a function of the initial voltage $U_O$ of the initial measurement that the blocking time decreases with an increase in the initial voltage $U_O$ (FIG. 3).

The invention is based on the principle that the initial voltage $U_O$ on the measurement probe at the start of the connect time is not only used to form a measurement of the oil level by comparison with the measurement voltage measured upon the end of the connect time but also, in a second function, in order so to control the blocking time transmitter for the production of a variable blocking time that the different return-flow time of the oil, which is dependent on the oil temperature, is taken into account before the entire device is freed for another measurement of the oil level, for instance after refilling. This device is thus inexpensive since the initial voltage $U_O$ is used for the control of the blocking time transmitter and an electric signal corresponding to the temperature of the oil need not be separately formed.

By the device of the invention the result can thus be obtained that within wide range of temperatures, the oil level can within a large temperature range only be measured again, after brief operation of a machine, so as to form a sufficiently exact signal which corresponds to the amount of oil actually present, after the oil present in the channels has flown back to a well-defined extent into the crankcase sump.

Such a dependence of the variable blocking time of the blocking time transmitter on the initial voltage $U_O$ or the oil temperature corresponding to it that the variable blocking time from 0 at 20° C. increases stepwise five minutes for every 10° K. decrease in temperature has been found advantageous (FIG. 3). A good approximation to the oil return-flow time as a function of the temperature is thus obtained with different grades of oil used in internal combustion engines.

Further according to the invention, the initial voltage $U_O$ can be fed, via an intermediate storage (18) and an latch circuit (20), into a decoder (21) which evaluates the initial voltage $U_O$ corresponding to the characteristic curve of the variable blocking time and, for the production of a blocking signal, sets a counter (22) which, controlled by the control logic (10), continues to count up to a predetermined counting value.

This provides a particularly suitable embodiment of the variable blocking time transmitter, which is developed as a settable counter, and of the means used for its control. The control means process the initial voltage $U_O$, which in particular has been fed at the start of the connect time of the measurement probe into an oil measurement counting mechanism for the formation of the signal analogous to the oil level. The initial voltage $U_O$ is fed, via the latch circuit, into the decoder, which contains the above-mentioned characteristic curve of the variable blocking time as a function of the initial voltage $U_O$. The decoder sets the counter of the blocking time transmitter, which counter is incremented with time pulses up to a predetermined final value, and during the counting process it forms the blocking time corresponding to the initial voltage $U_O$. The output signal blocks a new measurement of oil level via the control logic of the total program control.

Still further, in addition to the first blocking time transmitter (21-24) for the production of a variable blocking time as from the connecting of the switch (at the battery terminal 15) for the placing in operation again of the machine, a second blocking time transmitter (14) for the producing of a relatively short fixed blocking time as from the disconnecting of the switch and a third blocking time transmitter (17) for the producing of a relatively long fixed blocking time as from the disconnecting of the switch are provided, and the second or third blocking time transmitter is optionally activatable by the signalling logic (7). As such, the variable blocking time transmitter which is initiated as from the reconnecting of the switch for the placing in operation of the machine, in particular the ignition switch, can be advantageously combined with the second blocking time transmitter for the production of a relatively short fixed blocking time as from the disconnecting of the switch and with the third blocking time transmitter also for the production of a fixed but relatively long blocking time as from the disconnecting of the switch. The outputs of all blocking time transmitters are conducted, over a logical conjunction, to the control logic of the total program control so that similar output signals block a repetition of the measurement of the oil level. The second and third blocking time transmitters are not controlled as a function of temperature but are actuated by the signalling logic only to give off, in each case, a fixed blocking time. In the event that the signalling logic signals a "warning" operating condition, then, in particular, the blocking time transmitter of the short blocking time of preferably 30 seconds is actuated. This is a minimum time of protection which is provided for the return of the oil, but which, on the other hand, makes it possible to rapidly again measure the effect of a refilling on the level of the oil. If, on the other hand, it is signalled that the oil level was in the normal range before the starting of the machine, the third blocking time transmitter, which produces a relatively long blocking time of preferably four minutes, prevents oil being refilled prematurely after the turning off of the machine although actually a sufficient amount of oil would be present after the return of the oil into the crankcase sump. Since the above criteria, however, apply by way of approximation only for specific pre-established temperature conditions, the logical conjunction with the temperature-dependent formation of the blocking time provides assurance that the influence of the temperature-dependent oil viscosity is also taken into account.

Further according to the invention, the outputs of all blocking time transmitters are conducted via an OR member (15) to the control logic (10), so that a new measurement is blocked as long as a blocking time signal is present at any one of the outputs, all blocking time transmitters acting via said OR member in the same direction on the control logic to block a new measurement.

With the above and other objects in view, the present invention will become more clearly understood in connection with the detailed description of a preferred embodiment, when considered with the accompanying drawings, of which:

DETAILED DESCRIPTION OF THE PREFERRED EMBODIMENT

Figure 1:
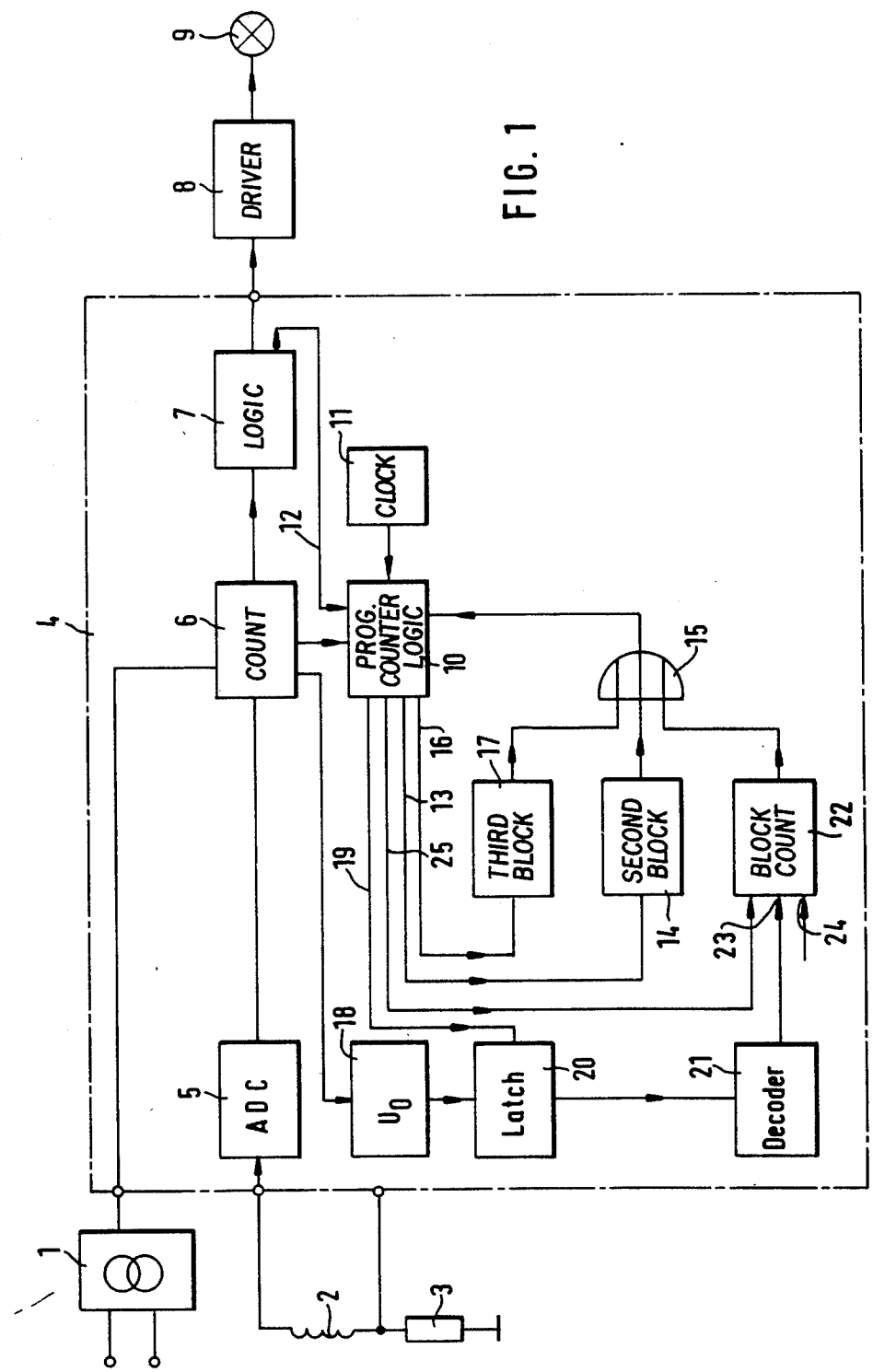
FIG. 1 is a simplified circuit diagram for the development of the measuring device with repetition block.

The measuring device with measurement repetition block according to FIG. 1 refers to the measurement of the oil level of an automobile engine. For the operation of the electrical device, the battery voltage at the so-called terminal 30 and the voltage at the ignition lock at the so-called terminal 35 are used ("35" and "30" are therefore not reference numbers). The battery voltage feeds a bipolar IC 1 which, inter alia, produces the constant current of a measurement probe 2. For this purpose, the current is measured on a resistor 3.

The voltage drop on the probe 2 is evaluated in a logic IC which is designated generally as 4. The logic IC also contains the measurement repetition block.

In detail, the logic IC contains an analog-digital converter 5 which converts the voltage drop on the measurement probe 2 into a digital number. This number is fed into an oil measurement counter 6. On the output side, the oil measurement counter is connected with a signalling logic 7 which distinguishes between the "warning" and "non-warning" conditions and sends a corresponding signal to a driver 8 outside the logic IC for the control of a signal lamp 9.

Figure 2:
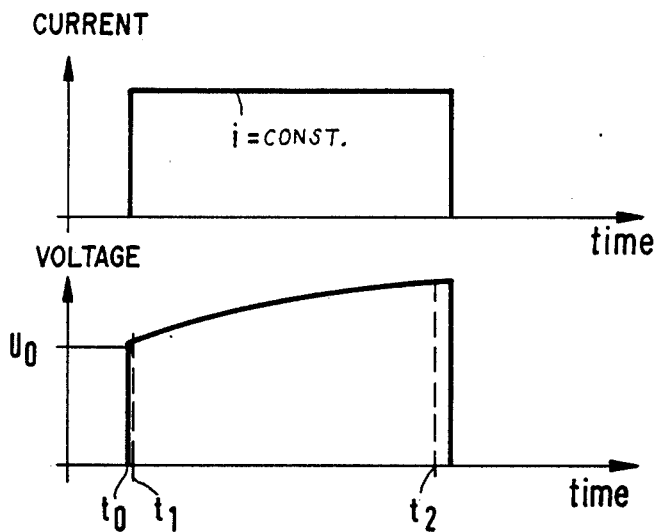
FIG. 2 is a graph showing the current and voltage variations in a known measurement probe in connection with the device shown in FIG. 1.

The oil measurement counter and the lamp logic are controlled by control logic from the total program control 10 and a clock pulse transmitter 11:

Referring to FIG. 2, after the connecting of the constant current by actuation of the ignition key at terminal 35, a constant current pulse is produced as from $t_0$. The initial voltage $U_O$ which drops then for a short time until the time $t_1$, which voltage is determined upon the first measurement, experiences conversion into a corresponding digital number by the analog-digital converter 5 and is fed as such into the oil measurement counter 6. Then, at the end of the connect time, a second measurement is effected of the voltage on the measurement probe, now the measurement voltage, at the time $t_2$, which voltage is also fed into the oil measurement counter as a digital number and is compared in the oil measurement counter with the digital number of the initial voltage $U_O$. The result of the comparison forms a measure of the oil level. Depending on the result of the comparison, which again is present as a digital number, the signalling logic recognizes the normal condition, signals "no warning," and the warning lamp remains off. Otherwise, in the event of "warning," the warning lamp is continuously lit. The signalling logic may have still another function, for the detection of a short circuit or interruption of the measurement probe, whereupon the warning lamp lights up continuously.

The state of the signalling logic is stored via a line 12 in the control logic 10.

The control logic 10, via a line 13, controls the so-called second blocking time transmitter—the first blocking time transmitter will be discussed further below—which is adapted to give off a relatively short fixed blocking time of 30 seconds as from the disconnecting of the ignition at the terminal 35. The second blocking time transmitter is marked 14. It acts, via an OR member 15 on the control logic in the manner of a self-holder so that no new measurement of the oil level is initiated by the control logic as long as the blocking time of 30 seconds has not expired.

In similar manner, a new measurement of the oil level is interrupted when the signalling logic signals the "no warning" condition over the line 12. Thereupon a third blocking-time transmitter 17 is initiated via a line 16, so that it operates for a period of 256 seconds, equal to about 4 minutes, and gives off a self-holding signal via the OR member 15 to the control logic 10, which in its turn blocks further measurement as from the disconnecting of the ignition for the said period of time.

For the variable blocking-time transmitter, a digital number corresponding to the initial voltage $U_O$—block 18—is read out of the oil measurement counter 6 and read on a pulse on a line 19 from the control logic into a latch 20 and stored therein. For the first blocking time transmitter a decoder 21 on the latch 20 converts the digital number corresponding to the initial voltage $U_O$ into a numerical value, which, in combination with a settable counter 22 which is connected to decoder 21 and into which counter the coded digital number is fed at a setting input 23, produces a variable blocking time corresponding to the graph of FIG. 3.

Figure 3:
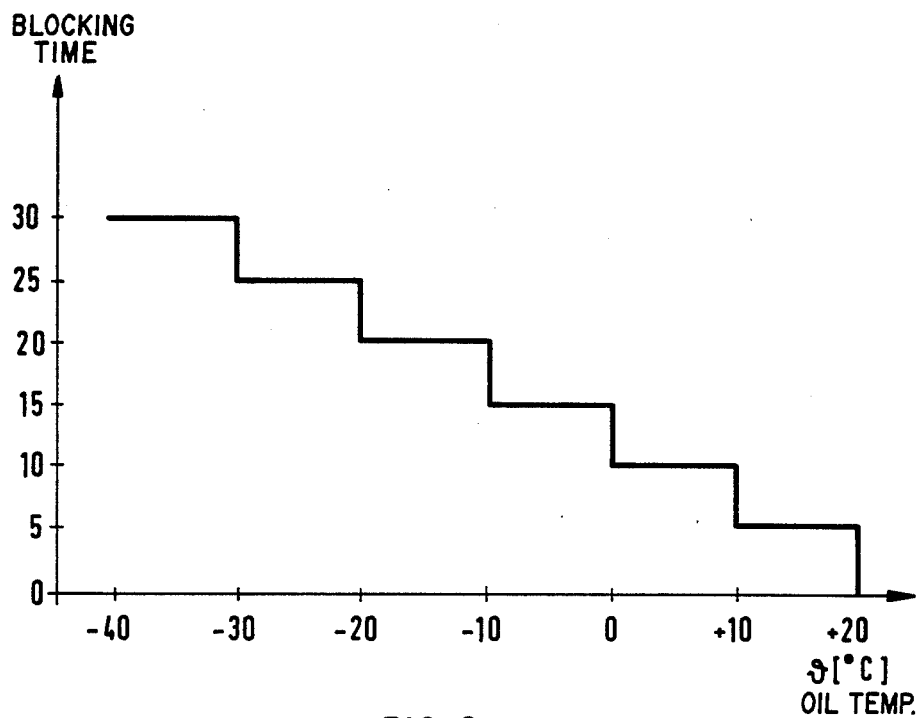
FIG. 3 is a graph showing the dependence of the variable blocking time on the temperature.

In FIG. 3, the blocking time produced as a function of the oil temperature in the settable counter 22 is shown, namely decreasing in steps of 5 minutes each per 10° K. so that at an ambient temperature of 20° C. the variable blocking time is zero.

The counter, which is set with a coded number as a function of the number in accordance with the initial voltage $U_O$, is decremented by time pulses at an input 24. This is done as soon as a signal is carried on a line 25 from the control logic upon the connecting of the ignition, which signal is brought about by the voltage at terminal 35. The settable counter 22, via the OR member 15, thus blocks the control logic, which prevents another measurement for the blocking time which can be noted from FIG. 3, as from early reactuation of the ignition key.

With the device shown in FIG. 1, therefore, various parameters which are controlling for a blocking of a measurement of the oil level are so taken into account that, on the one hand, as soon as possible after the additional filling of a quantity of oil, it can be noted how high the level in the machine actually is, while, on the other hand, erroneous measurements due to the oil which is present in the ducts of the machine and has not yet flown back are avoided.

In the device described, the initial voltage $U_O$ of the oil level rod is used to control the blocking-time transmitter.

It is evident that a different, more accurate transmitter can also be used for this, if the oil level rod is not sufficiently accurate as temperature sensor.

Furthermore, it should be pointed out, in particular, that the time of the variable measurement repetition block can also elapse during travel.

It is noted that the initial voltage measurement is an accurate measure of oil temperature at all values of oil level because this measurement is made before the probe has a chance to heat up from current passing through the probe. Therefore, the temperature of the probe is the same as the temperature of the oil in the engine oil sump. The electrical resistance and voltage drop across the probe are determined only by the oil temperature, and are not affected by subsequent heating of the probe, which heating is dependent on the level of oil in the sump. An increase in oil temperature raises or lowers the probe voltage depending on whether the probe is fabricated of material having, respectively, a positive or negative temperature coefficient.

Legends of FIG. 1

6 Oil measurement mechanism
7 Signalling logic
8 Driver
10 Control logic
11 Clock
12 Terminal 30
13 Terminal 35
17 Self-holder 256 seconds
17a Self-holder 30 seconds 17b Settable counter

Legends of FIG. 2 a Terminal 15
b i=constant
c $U_{probe}$

Legends of FIG. 3 d blocking time t in minutes

I claim:
1. In a device for temporarily blocking re-measurement of an electric oil measurement of a machine, having a measurement probe which is heated by a constant current during a connect time which is commenced by a switch for placing the machine in operation, means for comparing an initial voltage on the measurement probe at a start of the connect time with a later measurement voltage at the end of the connect time of a measurement period, a signaling logic controllable as a function of the result of the comparison in order to signal the oil level, and a blocking-time transmitter which, in combination with a control logic, blocks repeated measurement for at least a predetermined period of time after the machine is turned off or again turned on, the improvement wherein said device further comprises electric circuit means interconnecting said probe with said blocking-time transmitter, said circuit means being driven by said control logic to transmit said initial voltage from said probe to said blocking-time transmitter, said initial voltage being a measure of temperature of the oil, there being a single probe providing both said initial voltage and said later measurement voltage; and wherein said blocking-time transmitter produces a variable blocking time as a function of said initial voltage such that the blocking time decreases with an increase in temperature of the oil;

said comparing means includes a counter, there being an analog-to-digital converter interconnecting said counter and said probe for converting analog voltage of said probe to a digital number for said counter, both said initial voltage and said later measurement voltage being converted to digital numbers for said counter; and said counter and said signaling logic is responsive to both said initial voltage at the start of said connect time and said later measurement voltage at the end of said connect time, under control of the combination of said control logic and said blocking-time transmitter, to output an oil-level measurement.

2. The device according to claim 1, wherein
the variable blocking time is from 0 at 20° C. and increases stepwise five minutes for every 10° K. decrease in temperature.

3. The device according to claim 1, wherein said circuit means further comprises
an intermediate storage, and a decoder; and
the initial voltage is feedable, via said intermediate storage, into said decoder which evaluates the initial voltage corresponding to a characteristic curve of the variable blocking time.

4. The device according to claim 1, wherein said circuit means further comprises
an intermediate storage, a latch circuit, and a decoder; and
the initial voltage is feedable, via said intermediate storage and said latch circuit, into said decoder for the production of a blocking signal; and said blocking-time transmitter comprises
a counter, wherein said blocking signal sets said counter which, controlled by said control logic, continues to count up to a predetermined counting value.

5. The device according to claim 1, wherein said circuit means further comprises
an intermediate storage, a latch circuit, and a decoder; and
the initial voltage is feedable, via said intermediate storage and said latch circuit, into said decoder, said decoder evaluating the initial voltage corresponding to a characteristic curve of the variable blocking time to produce a blocking signal; said blocking-time transmitter comprising
a counter, wherein said blocking signal sets said counter which, controlled by said control logic, continues to count up to a predetermined counting value.

6. The device according to claim 1, wherein
said machine is an internal combustion engine, and said switch is an ignition switch.

* * * * *